W. H. DEWEES.
COOKER.
APPLICATION FILED MAR. 24, 1909.

976,156.

Patented Nov. 22, 1910.

Witnesses:
E. Behel.
E. B. Clark.

Inventor:
William H. Dewees
By A. O. Behel
Atty.

UNITED STATES PATENT OFFICE.

WILLIAM H. DEWEES, OF CHICAGO, ILLINOIS.

COOKER.

976,156.　　Specification of Letters Patent.　　Patented Nov. 22, 1910.

Application filed March 24, 1909. Serial No. 485,515.

*To all whom it may concern:*

Be it known that I, WILLIAM H. DEWEES, a citizen of the United States, residing at Chicago, in the county of Cook and State of Illinois, have invented certain new and useful Improvements in Cookers, of which the following is a specification.

The object of this invention is to construct a fireless cooker in which heat is supplied beneath the food receptacle and openings are provided for the circulation of air around the food receptacle.

The further object of this invention is to support the cooker in a suspended receptacle which is especially useful on ship board.

Figure 1:
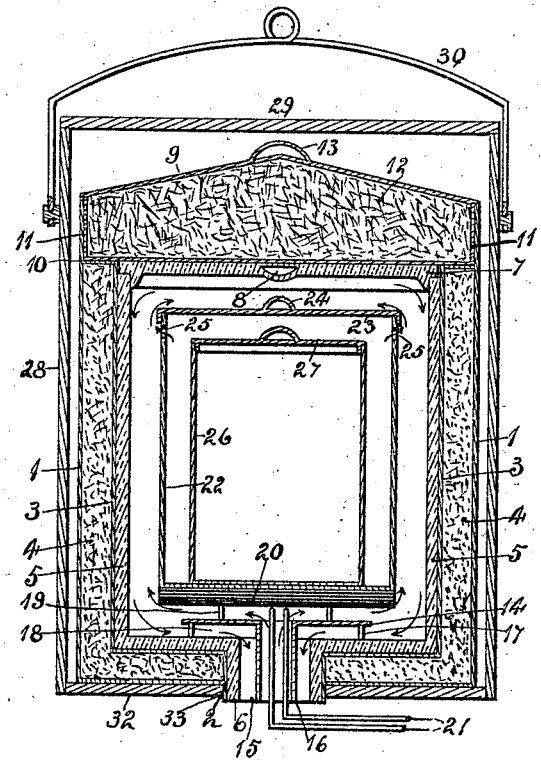
Figure 2:
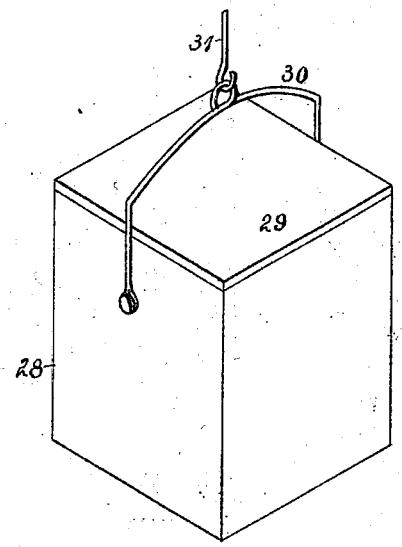

In the accompanying drawings, Figure 1 is a vertical central section through my improved cooker. Fig. 2 is a perspective view of the suspended case.

My improved cooker comprises the outer casing 1 having an open upper end and an opening 2 formed in the bottom thereof. An inner casing 3 is separated some distance from the outer casing 1, and between the casings is placed a filling 4. Inside of the inner casing 3 is located a lining 5 of earthen or stone ware which has its lower end 6 depending through the opening 2. A cover 7 is provided for the lining 5 and has a hand hold 8.

A cover for the open end of the outer casing is formed of the top 9, bottom 10 and ends 11 and has the filling 12. A handle 13 is connected with this cover. The outer edge of the top 9 projects beyond the ends 11 and rests upon the open end of the casing 1, and the bottom extends over the filling 4 between the outer casing 1 and inner lining 3, and also over the cover 7.

A support 14 forming a division plate is located within the lining 5 over the central opening 15 therein, and has a depending tubular nipple 16 forming an intake flue centrally within the opening 15, the portion of the opening surrounding the nipple, forming a discharge flue. This support rests on projections 17 located on the bottom section of the lining 5, thereby leaving a space 18 beneath the support. The support 14 has a plurality of uprising projections 19 on which is located, in this instance, an electric heater 20 from which extend wires 21 which are adapted to connect with any suitable source of electricity. The heater 20 supports a shell 22 of aluminum which has its upper end open, and a cover 23 of the same material is placed over said open end. A handle 24 is provided on the cover. Openings 25 are formed through the upper end of this shell. Within the shell 22 is located a cooking vessel 26 provided with a cover 27.

The cooker as a whole is located within a box 28 having a removable cover 29. A bail 30 has a connection with the box and is suspended by the hook 31. The bottom 32 of the box is formed with an opening 33 through which the lining 6 extends.

The article to be cooked is placed in the receptacle 26, the various covers closed, and the box cover 29 is placed in position. The electrical current is turned on and the heater will become hot, which will heat the bottom of the aluminum shell 22, and it in turn will heat the cooking vessel and the contents therein. Should any moisture escape from the cooking vessel 26 it will be retained in the aluminum shell and finally evaporated through the openings 25. A circulation of air will be maintained around the aluminum shell as indicated by the arrows. The lining 5 and cover 7 are of heat non conducting material and in connection with the fillings 4 and 12 prevent the radiation of heat. By locating the cooker within the box 28 and suspending the box so that it may swing, it will be especially applicable for use on ship board.

I claim as my invention.

1. In a cooker, the combination with a casing, of a food receptacle located therein and spaced therefrom, forming an air space within the casing and beneath the food receptacle, said casing having an opening beneath the receptacle communicating with the air space, a substantially horizontal division plate located in the air space in spaced relation to the receptacle and casing and having an outstanding tubular nipple extending into the opening, of less cross sectional area than said opening and communicating at its upper end with the space above said plate, and means located on one side of the plate for heating the receptacle, and causing a circulation of air.

2. In a cooker, the combination with a casing, of a food receptacle located therein and spaced therefrom, forming an air space, said casing having an opening communicating with the air space, a division plate located in the air space and spaced from the casing and receptacle, said plate having an outstanding tubular nipple extending into the opening and spaced from the walls of the opening, said nipple opening through the plate, and heating means interposed between said plate and food receptacle.

3. In a cooker, the combination with an outer insulated casing having an opening through its bottom, of a substantially horizontal plate arranged within the receptacle above and in spaced relation to the bottom, said plate having a depending tubular nipple of less cross sectional area than the opening and extending into said opening and having its upper end communicating with the space above the plate, heating means within the casing and a food receptacle supported over the plate in spaced relation thereto.

4. In a cooker, the combination with an insulated casing having a bottom opening, of a plate supported within the lower portion of the casing and having a depending tubular nipple projecting into the opening and of less diameter than the same, said nipple opening through the plate, a food receptacle supported above the plate in spaced relation thereto, and heating means for the food receptacle arranged beneath the same and over the plate in spaced relation to the latter.

In testimony whereof I have hereunto set my hand in presence of two subscribing witnesses.

WILLIAM H. DEWEES.

Witnesses:
H. A. KIDDELL,
J. L. ONDERDONK.